Patented Feb. 17, 1953

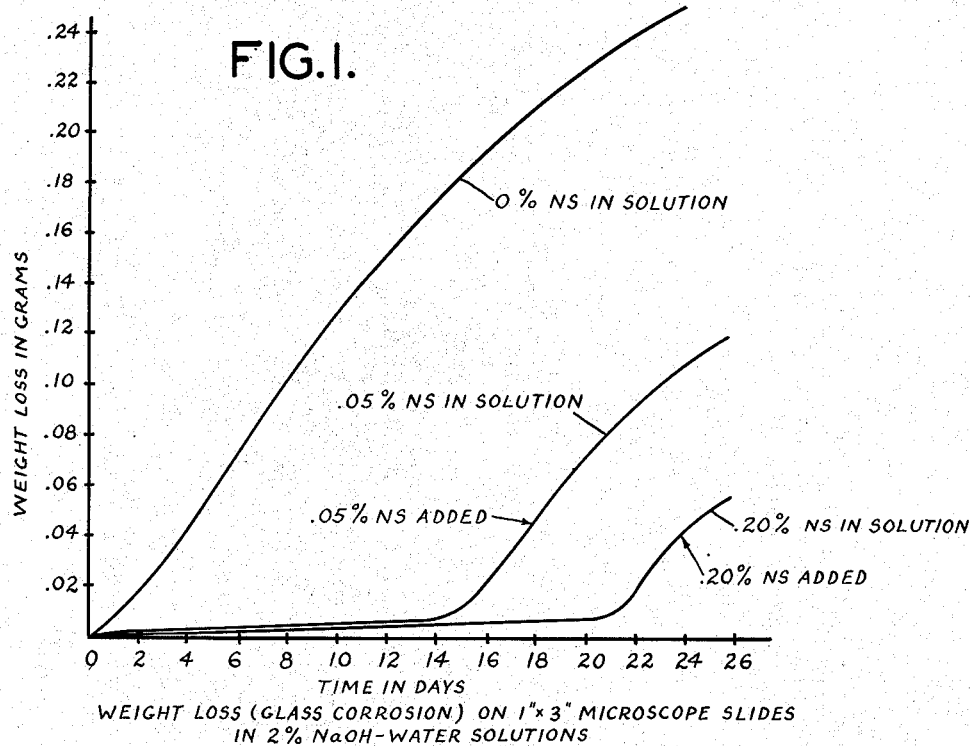
WEIGHT LOSS (GLASS CORROSION) ON 1"x 3" MICROSCOPE SLIDES IN 2% NaOH-WATER SOLUTIONS
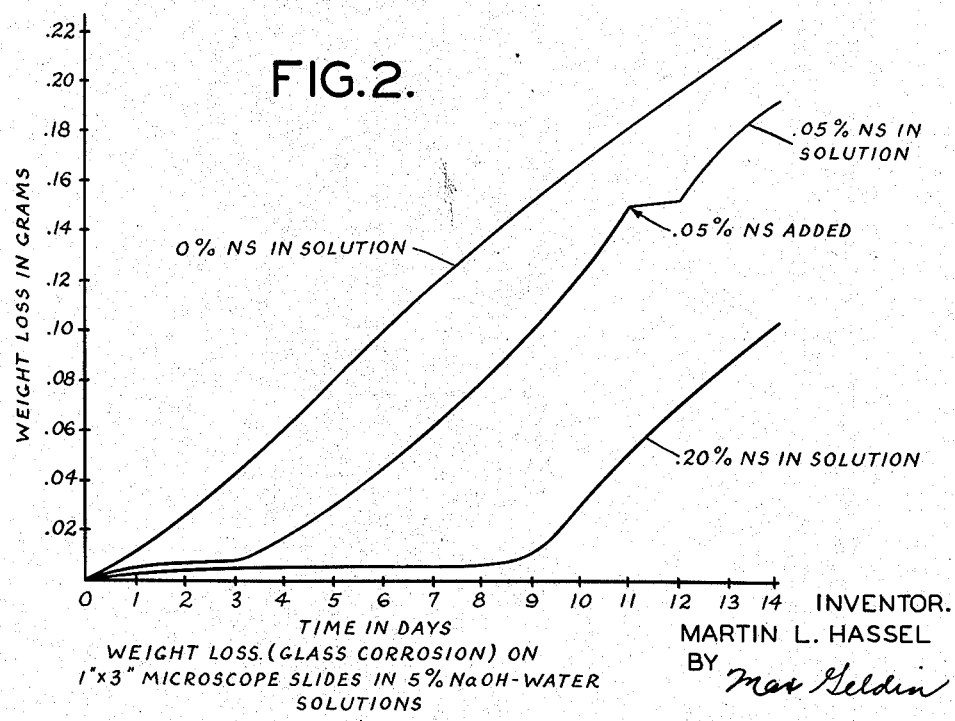
WEIGHT LOSS (GLASS CORROSION) ON 1"x 3" MICROSCOPE SLIDES IN 5% NaOH-WATER SOLUTIONS
INVENTOR.
MARTIN L. HASSEL
BY Max Geldin
ATTORNEY.

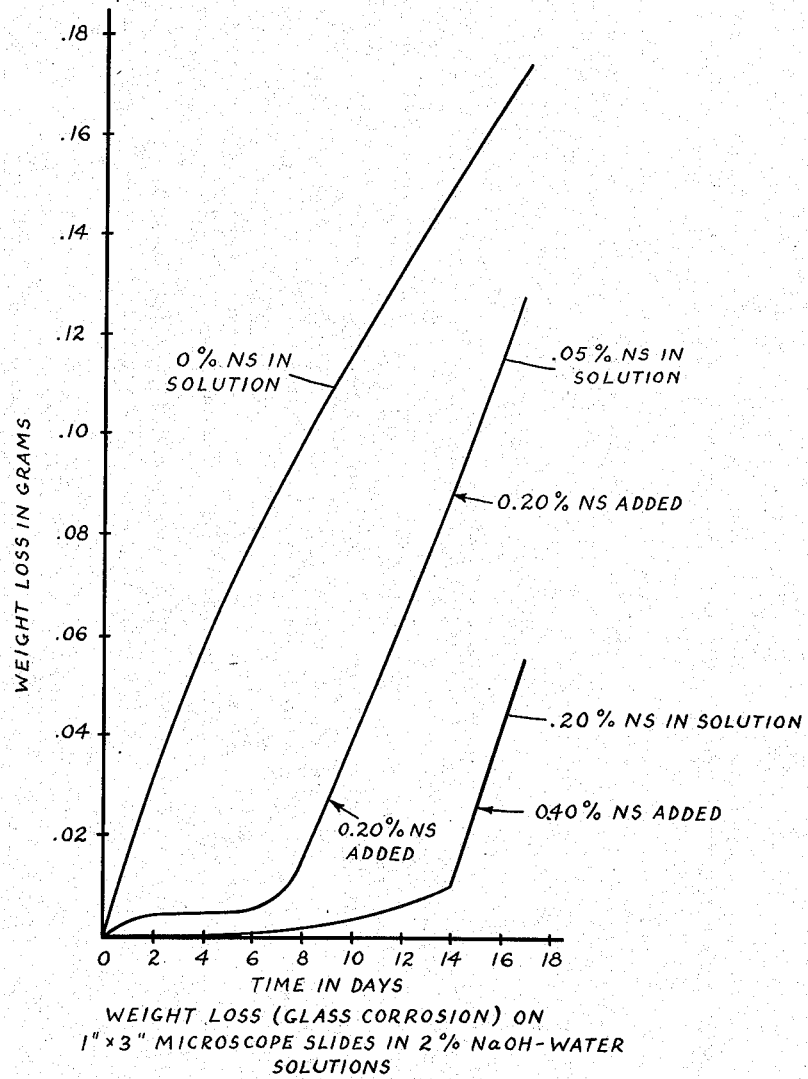

2,628,943

UNITED STATES PATENT OFFICE 2,628,943

METHOD OF WASHING GLASS BOTTLES AND COMPOSITION THEREFOR

Martin L. Hassel, St. Louis, Mo., assignor to Allied Chemical & Dye Corporation, New York, N. Y., a corporation of New York Application March 21, 1950, Serial No. 150,996

16 Claims. (Cl. 252—156)

This invention relates to dry detergent compositions and to aqueous washing solutions particularly adapted for cleaning glassware such as bottles. The invention is also concerned with a process for inhibiting attack of the surfaces of glass containers, bottles and the like by the caustic alkali constituent of aqueous solutions generally used for washing such glass articles.

In commercial washing of bottles, returnable milk, beer and soft beverage bottles are placed in metal pockets forming part of the conveyor of a washing machine. During passage through the machine, the bottles are either soaked in or sprayed by a washing solution, followed by brushing and rinsing. Commercially employed aqueous bottle washing solutions ordinarily contain caustic soda alone or in conjunction with one or more of the milder alkalies. Through usage, bottles gradually become scratched or marred and their useful life reduced. Considerable thought has been given to the cause of so-called bottle scuffing in an effort to decrease the resultant breakage and loss as well as to help maintain the high polish on and good appearance of bottles as received from the manufacturer. While it is thought that the abrasion of bottle surfaces results from mechanical action, it is recognized now in the trade that the bottle washing solutions substantially contribute to the damage by tending to dissolve, etch or soften the glass thus rendering the surfaces more easily abraded by mechanical action. As an example of recent developments in this field in an effort to solve this glass corrosion problem, U. S. Patent 2,419,805 issued April 29, 1947, to Wegst et al., discloses the use of beryllium compounds such as beryllium sulfate to inhibit the glass-dissolving action of aqueous alkali solutions.

One object of my invention resides in provision of detergent compositions which exhibit reduced attack of the active detergent ingredients on glass. The invention also aims to provide detergent compositions and washing solutions containing a glass attack inhibiting agent which does not interfere with or reduce the cleaning properties of the active detergents. A further object of the invention is to afford a process for preventing attack of glass by alkali solutions. Another aim of the invention is to provide a process for inhibiting attack of the surfaces of glassware including containers, bottles and the like by the caustic alkali detergent, usually caustic soda, in the aqueous solutions employed for washing and cleansing such glassware. Other objects and advantages will appear hereinafter.

I have found that the tendency of aqueous alkali solutions substantially free of phosphates and containing caustic alkali, particularly caustic soda, as the principal solute, to attack glass is inhibited or greatly reduced by adding to the solutions a nitrosation-sulfitation product comprising salts of a mixture of organic acids having carbon contents within the range 10 to 30 carbon atoms, such mixture including sulfonated ketones, sulfonated amines, sulfonated alkylidene sulfamates, sulfonated sulfamates and bisulfite addition products of sulfonated alkylidene sulfamates, and being derived from an unsaturated organic compound having at least one non-aromatic

linkage and a carbon content within the range 10 to 30 carbon atoms, by a process involving reaction of a nitrosating agent with a non-aromatic

linkage of the unsaturated organic compound and reaction of the resulting nitrosation product with a sulfite. The presence of the foregoing nitrosation-sulfitation product in the caustic alkali washing solutions, so far as I have ascertained, does not adversely affect the cleansing power thereof, while successfully preventing alkali corrosion of the glass surfaces during the washing treatment, such corrosion considered to be in the nature of a dissolution of the glass by the alkali.

The nitrosation-sulfitation addition agents of these improvements and the method of their preparation are described in detail in U. S. Patents 2,265,993 of December 16, 1941; 2,313,719 of March 16, 1943; and 2,336,387 of December 7, 1943, all issued to L. J. Beckham.

A preferred form of the present invention involves the use of nitrosation-sulfitation products having carbon contents within the range 12 to 23 carbon atoms, and comprising mixtures of organic sulfonates, particularly open-chain organic sodium sulfonates, including sulfonated ketones, sulfonated amines, sulfonated alkylidene sulfamates, sulfonated sulfamates (especially sulfonated alkyl sulfamates) and bisulfite addition products of sulfonated alkylidene sulfamates in the form of alkali metal and ammonium salts, which have been produced from a carboxyl-substituted unsaturated hydrocarbon or from an olefin hydrocarbon or from a mixture of olefin hydrocarbons obtained from petroleum, having at least one non-aromatic

linkage and carbon content within the range 12 to 23 carbon atoms, by a process involving reaction of a nitrosating agent (for example, NOCl, NOBr, $N_2O_4$ or $N_2O_3$) with a non-aromatic

linkage of said unsaturated organic compound and reaction of the resulting nitrosation product with an alkali metal or ammonium sulfite.

The unsaturated organic compounds employed as intermediates for the nitrosation products include olefin hydrocarbons as well as carboxyl derivatives thereof comprising free carboxylic acids, their esters, salts, amides, chlorides, and the corresponding nitriles. Starting materials especially adapted for the manufacture of the nitrosation-sulfitation products employed in the invention are mono-olefins, of which at least 8 of the carbon atoms are disposed in a continuous carbon chain. Mono-olefins having a carbon content which lies within the range 12 to 23 carbon atoms are especially suitable. (It is to be understood that, where ranges are given herein, they include the limits.) The use of mixtures comprising olefins of different chain length within the aforesaid range is advantageous.

The unsaturated organic compounds serving as raw materials may be straight-chain compounds, or secondary or tertiary branched-chain compounds. They may contain one or more, especially one to two, non-aromatic

linkages per molecule. The double bonds may be located at terminal or intermediate positions in the carbon chains. The most valuable compounds for my purpose are obtained from olefins and carboxyl-substituted olefins containing an olefinic linkage at the end of a carbon chain of at least 8 carbon atoms.

The source of the unsaturated organic compounds may be animal, vegetable, or mineral. Thus, suitable olefins may be prepared by dehydrating alcohols obtained by hydrogenation of naturally occurring fats and oils (such as tallow, palm oil, cocoanut oil, olive oil), or the corresponding free acids. Or the olefins may be prepared by the Fischer-Tropsch synthesis, or by cracking waxes, or by cracking or dehydrogenating natural or synthetic (Fischer-Tropsch) petroleum or petroleum fractions, or by halogenating and then dehydrohalogenating such materials, or by polymerizing low molecular weight olefins.

Olefinic mixtures containing olefins and saturated hydrocarbons, derived from natural or synthetic (Fischer-Tropsch) petroleum directly or by thermolytic treatments thereof, constitute highly satisfactory initial materials for preparing the nitrosation-sulfitation products utilized in the present invention. Thermolytic treatments which have been found to yield large proportions of the desired olefins are catalytic and non-catalytic cracking, catalytic dehydrogenation, and combinations thereof. The preferred olefinic mixtures, comprising for the most part hydrocarbons having 10 to 30 carbon atoms per molecule, may be segregated from less desirable products of the treatment by fractional distillation. Since paraffinic, aromatic or saturated alicyclic hydrocarbons or other relatively inert diluent liquids, especially liquids which are solvents for the olefin or olefins being reacted, may be present during formation of the nitrosation products, non-olefinic hydrocarbons present in such thermolytic-processed petroleum distillate fractions may be permitted to remain, and may be separated after the sulfitation treatment as water-insoluble oils. The petroleum may be fractionally distilled prior to the thermolytic treatment, to provide an oil containing an increased proportion of the hydrocarbons containing 10 and more carbon atoms per molecule. Saturated aromatic constituents, to the extent they are acted upon by the nitrosating agents form active producs which may be converted by aqueous sulfites and bisulfites to water-soluble suitable products.

Examples of suitable olefins are cetene (derived from spermaceti and comprising for the most part cetene-1), 2-methylpentadecene-2, dodecene-1, pentadecene-7, tricosene-11, nondecene-9, 10-methyl nondecene-9, and olefin-containing $C_{16}$–$C_{23}$ mixtures obtained by cracking topped, crude, natural or synthetic petroleum or by dehydrogenating a petroleum distillate (such as gas oil) or by reacting carbon monoxide and hydrogen in the presence of a catalyst such as cobalt (the Fischer-Tropsch synthesis). Some synthetic petroleums contain relatively high proportions of olefins as compared with natural petroleum and hence are more suitable for use without a concentration or thermolysis to increase the olefin content.

Suitable substituted olefins are esters of unsaturated fatty acids (such as acrylic acid and oleic acid), mono- and di-esters of maleic acid, or mixtures such as the alkenyl succinic acid esters obtained by condensation of maleic anhydride with olefin fractions obtained by cracking or dehydrogenating natural or synthetic petroleum or by catalytic processes (such as the Fischer-Tropsch synthesis) and esterification of the unsaturated dicarboxylic acid anhydrides formed, with saturated mono-, di-, or tri-hydroxy alcohols (such as methanol, ethanol, propanol, isopropanol, the butanols and pentanols, glycol and glycerin and their homologs, lauryl alcohol, myristyl alcohol and cetyl alcohol); the esters of saturated fatty acids (such as acetic, lauric and stearic acids) with unsaturated alcohols (such as allyl alcohol and its homologs); the mono-esters and the symmetrical and unsymmetrical di-esters of succinic acid with unsaturated alcohols, or with an unsaturated alcohol on the one hand and a saturated alcohol on the other; the free oleic and alkenyl succinic acids and their alkali-metal salts and acid chlorides; the amides of saturated fatty acids and unsaturated amines; the amides of unsaturated fatty acids and amines (e. g., di-methyl amine, methyl butyl amine, ethyl butyl amine, etc.); and unsaturated ketones.

Specific examples of substituted olefins are butyl oleate, oleic acid, methyl oleate, isopropyl oleate, allyl stearate, allyl laurate, the di-n-octyl ester of octenyl (or nonenyl, decenyl, or undecenyl)-succinic acid, oleic acid amide, N-methyl oleic acid amide, N-dimethyl oleic acid amide, oleic acid anhydride, oleic acid chloride, oleic acid nitrile, N-allyl lauric acid amide, N-oleyl butyric acid amide, N-methyl N-oleyl propionic acid amide, N-ethyl N-oleyl acetic acid amide, N-methyl N-lauryl 4-hexenoic acid amide, N-decyl 3-pentenoic acid amide, 3-methyl-4-dimethyl-cyclopentane-1-carboxylic acid ester of allyl alcohol, and oleone.

Examples of suitable unsaturated ring compounds are N-lauryl cyclohexene and $\Delta^2$-3-methyl-4-dimethyl-cyclopentene-1-carboxylic acid ester of butanol-1.

In addition to organic compounds the nitrosation-sulfitation adjuvant materials prepared in the manner noted above ordinarily also comprise a mixture of inorganic salts formed in the reactions involved in such preparation, these inorganics including sodium sulfite, sodium bisulfite, sodium chloride and sodium sulfate, with a small amount of sodium sulfamate also often present. Usually the nitrosation-sulfitation products of the invention contain from 30 to 40% organic compounds, 10 to 30% of a mixture of sodium sulfite and sodium bisulfite, 5 to 15% sodium chloride and 20 to 40% sodium sulfate. A typical product is one containing about 35% organic compounds, 25% sodium sulfite and bisulfite mixture, 10% sodium chloride and 30% sodium sulfate. The inorganic salts in the nitrosation-sulfitation products employed in accordance with the invention appear to improve the glass corrosion inhibiting properties of the product, and it is accordingly preferred not to remove these salts. However, suitable nitrosation-sulfitation products free of inorganic salts, for use in the instant process may be obtained in the manner disclosed in U. S. Patent 2,436,243 issued February 17, 1948, to L. J. Beckham, i. e. by extracting aqueous solutions of products resulting from the nitrosation and sulfitation reactions noted above, with a solvent such as isopropanol, isobutatol or tertiary butanol, followed by removal of the solvent. While the resulting products free of inorganic compounds are applicable in my process, it is more advantageous and simpler to use the unrefined nitrosation-sulfitation product mixtures containing the inorganics formed during preparation.

Generally, practice of this invention includes use of alkali metal detergents and alkali metal salt glass attack inhibiting agents. However, since economical considerations place sodium salts in a position of dominating importance, for convenience and simplicity the invention is discussed and illustrated herein mostly in terms of sodium detergents and the sodium salts of the inhibiting agents.

The nitrosation-sulfitation inhibiting agents of the invention are compatible with the detergent constituents, particularly caustic soda, when the inhibiting agents and detergents are mixed in the form of a dry composition. Further, the inhibiting agents of the invention are soluble and stable in the dilute aqueous caustic alkali solutions employed for glass washing under the conditions of operation. It will be understood that commercial bottle washing operations are carried out using heated solutions maintained at a temperature generally not higher than 175° F. and usually on the order of 140–165° F. The amount of nitrosation-sulfitation product used is sufficient, under the particular conditions of operation, to inhibit attack of the detergent composition on glass.

Dry detergent compositions of the invention may contain caustic soda (sodium hydroxide) in any amounts such that when the dry material is added to water there is formed a solution having suitable NaOH concentration for glass washing. The dry compositions ordinarily contain by weight 50% or more of caustic soda. These compositions may also include variable quantities of one or more other alkaline cleaning compounds exclusive of phosphates, such as $Na_2CO_3$, $NaBO_2$ or any other suitable detergent materials. If silicates are employed as an auxiliary detergent material, for reasons noted below they should not be present in amounts greater than 5% by weight of the caustic soda. The preferred dry compositions contain not less than 75% by weight of NaOH, inhibiting agent in amounts hereafter described and, if desired, variable amounts of other suitable cleaning agents.

The nitrosation-sulfitation products in the dry detergent compositions of these improvements are readily soluble in dilute aqueous caustic soda solutions, i. e. aqueous solutions having an NaOH concentration up to about 10% by weight. In the dry compositions, i. e. a form ready to be added to water to make up the washing solution, the nitrosation-sulfitation products are preferably present as sodium salts. Whatever its specific composition may be, the amount of inhibiting agent in the dry compositions of the invention is generally in the range 1 to 50% by weight of the caustic soda, preferably 2 to 20% by weight thereof. A typical preferred composition of the invention comprises by weight 90 to 95 parts NaOH, 0 to 5 parts $Na_2CO_3$ and about 5 parts of the nitrosation-sulfitation product of Example 1 below.

The dry detergent compositions of the invention are produced by mixing the various ingredients in the proper amounts in any suitable manner.

Practice of the invention does not necessarily involve preliminary manufacture of dry compositions, which when added to water, provide washing solutions of suitable concentrations. Washing solutions may be made up for example by adding to water caustic soda, or mixtures of the same with other milder alkaline detergents, in amounts needed to form washing solutions having the desired NaOH concentrations, and subsequently adding to the aqueous solution the inhibiting agents of the invention.

The caustic alkali or NaOH concentration of the aqueous washing solutions may be of any suitable value, although ordinarily such concentration is of the order of 1–10% and the preferred NaOH concentrations of the washing solutions of the invention are in the range of 1–6% by weight. The amount of nitrosation-sulfitation product incorporated in the alkali washing solution in accordance with the invention is not less than 0.01% by weight of the total washing solution, no particular advantages being obtained where the amount of such addition agent is more than 5% by weight. Usually, larger amounts of inhibitor are used with alkali solutions of progressively greater strengths. In general practice, the valuable glass corrosion inhibiting effects of the invention are readily obtained when the caustic soda washing solutions hereof contain an amount of nitrosation-sulfitation material in the range of 0.03 to 1% by weight of solution. I find that the most satisfactory results are secured, particularly with respect to aqueous solutions containing 1-6% NaOH, when using a preferred range of 0.05 to 0.5% by weight of the inhibitor.

To attain the highly beneficial glass corrosion inhibiting results of the invention utilizing the nitrosation-sulfitation materials above described, it is necessary that the aqueous solutions containing the caustic alkali detergent be substantially free of phosphates, for example $Na_3PO_4$, $Na_4P_2O_7$ and $Na_6P_4O_{13}$, often used in conjunction with caustic soda for cleaning purposes. In this connection I have found for instance that as little as 0.15% $Na_3PO_4$ in 3% NaOH solutions nullifies the inhibiting effect of 0.2% by weight of the nitrosation-sulfitation product prepared in accordance with Example 1 below. However, the alkali washing solutions hereof may contain variable quantities of one or more other detergents such as carbonates, borates and silicates. Carbonates and borates may be present in an amount up to about 0.5% by weight of solution, together with caustic soda and the nitrosation-sulfitation material. Since silicates have a tendency to adversely affect the inhibiting action of the nitrosation-sulfitation addition agents of the invention to some degree, the proportion of silicates included in the alkali solutions utilized in accordance with the invention principles should be carefully controlled and should not exceed 0.2% by weight of solution.

The following are illustrative examples of the preparation of typical nitrosation-sulfitation products used in accordance with my process, all quantities being expressed in parts by weight:

*Example 1.*—A nitrosation-sulfitation product of the type disclosed in U. S. Patent 2,265,993 was prepared as follows: 357 parts of a cracked petrolatum fraction composed mainly of hydrocarbons containing from 14 to 23 carbon atoms (with 7.2% of higher molecular hydrocarbons), the average carbon content of the olefins contained therein being 15.9 carbon atoms per molecule and the mixture including the molecular equivalent of 62.2% of mono-olefins, were gradually mixed over the course of 6 hours with 1.24 parts (1.9 mols) of liquid nitrosyl chloride and the mixture was agitated and cooled to maintain the temperature below 30° C. Upon completion of the reaction, the liquid mixture was aerated to remove unreacted nitrosyl chloride, and insoluble gum which was formed by the reaction was allowed to settle. The liquid portion of the reaction was decanted and mixed with an aqueous solution containing a mixture of sodium bisulfite and sodium sulfite in a molar ratio of 1 to 5, prepared by dissolving 400 parts (3.85 mols) of sodium bisulfite ($NaHSO_3$) and 170 parts (1.6 mols) of sodium carbonate in 900 parts of water and 138 parts of isopropyl alcohol. The mixture was boiled under reflux with agitation at a temperature of about 82° C. for about 8 hours. It was then cooled and allowed to stand quiescent until it separated into two layers. The aqueous layer was separated from the oily layer, the pH of the aqueous layer was adjusted to 8.0 with sodium carbonate, and residual hydrocarbons emulsified within the aqueous mass were removed by extracting at 40° to 50° C. with about twice its volume of a heptane fraction of petroleum. The isopropyl alcohol was removed from the extracted aqueous solution by distillation. The composition of the aqueous solution was adjusted by addition of the necessary quantity of sodium sulfate so as to yield, on evaporation to dryness, a mixture having a concentration of organic compounds such that the total mixture contained 17.5% carbon. The solution was then evaporated to dryness on a drum drier. The resulting nitrosation-sulfitation product contained 30 to 40% organic compounds, 10 to 30% of a mixture of sodium sulfite and sodium bisulfite, 5 to 15% sodium chloride and 20 to 40% sodium sulfate.

*Example 2.*—A 30% aqueous solution of a nitrosation-sulfitation product formed by the procedure of Example 1 was prepared, and one part of such solution was passed countercurrent to one part of isobutanol in a packed column, equivalent to 3 to 5 theoretical plates. The organic constituents passed into the alcohol phase which was drawn off the top of the column and freed of the alcohol by distillation. The resultant alcohol-free solution containing about 50% of a nitrosation-sulfitation mixture composed essentially of organics only, and 50% water may be drum dried or spray dried. The aqueous phase from the countercurrent extraction operation containing the inorganic constituents of the initial nitrosation-sulfitation starting material, was also freed of alcohol by distillation.

The following constitute illustrative examples of the application of typical nitrosation-sulfitation products of the invention to caustic alkali solutions for the purpose of inhibiting attack of glass by the alkali or caustic soda content of such solutions in accordance with the principles of the invention. Since it is considered that the alkali attack upon the surfaces of glass articles such as bottles during washing is in the nature of a dissolution of the glass by the alkali, in all of the examples below, the weight loss of the glass objects subjected to the action of the various alkali solutions had been taken as a reliable criterion for measuring the degree of such attack. In the following examples the expression "NS" is intended to denote the dry nitrosation-sulfitation product produced in Example 1 above, and the expression "NSBF" refers to the dry nitrosation-sulfitation material formed by the procedure of Example 2.

*Example 3.*—Two six-ounce soft glass laboratory sample bottles each having an inside surface area of 90 sq. cm. were each filled with 100 cc. of 5% aqueous sodium hydroxide solution, and 1.0% by weight of solution of NS was added to the contents of bottle No. 2. The bottles were sealed and placed in a bath maintained at 190° F. for 4 days. The bottles were weighed prior to placement in the bath and at the end of the 4 day period. Table 1 below sets forth the data and results of these tests.

*Table 1*

| Bottle No. | Percent NaOH | Percent NS | Weight Loss, gms | Corrosion Rate, mg./cm.²/day |
|---|---|---|---|---|
| 1 | 5 | 0 | 0.9318 | 1.40 |
| 2 | 5 | 1.0 | 0.2610 | 0.39 |

The above table clearly indicates that the NS material used in accordance with the invention had a definite inhibiting action on the caustic etching of the glass.

*Example 4.*—Twenty-one "Coca Cola" bottles each having an inside surface area of about 420 sq. cm., were weighed and separated into two groups, each bottle except one in the first group consisting of 9 bottles being filled with 150 cc. of 5% aqueous NaOH solution, and each bottle except one in the second group of 12 bottles being filled with 150 cc. of 2% aqueous NaOH solution. The one remaining bottle in each of the two groups was filled with water. Various concentrations of NS ranging from 0% to 4% by weight were added to the respective bottles of the first group containing 5% NaOH, and quantities of NS ranging from 0% to 1.5% by weight were added to the respective bottles of the second group containing 2% NaOH. The first group of 9 bottles was maintained at 190° F. for 7 days and the second group of 12 bottles maintained at 190° F. for 10 days. The results of these tests are noted in Table 2 below.

Table 2

| Bottle No. | Percent NaOH | Percent NS | Weight Loss, gms. | Corrosion rate, mg./sq.cm./day |
|---|---|---|---|---|
| 1 | 5 | 0 | 2.70 | 0.92 |
| 2 | 5 | 0.40 | .10 | .035 |
| 3 | 5 | 0.50 | .12 | .041 |
| 4 | 5 | 1.00 | .08 | .027 |
| 5 | 5 | 1.25 | .08 | .027 |
| 6 | 5 | 1.50 | .15 | .051 |
| 7 | 5 | 2.00 | .09 | .031 |
| 8 | 5 | 4.00 | .12 | .041 |
| 9 | Water | | 0 | 0 |
| 10 | 2 | 0 | .32 | .076 |
| 11 | 2 | 5 | .21 | .050 |
| 12 | 2 | 4 | .13 | .031 |
| 13 | 2 | 3 | .10 | .024 |
| 14 | 2 | 2 | .15 | .036 |
| 15 | 2 | 1.5 | .14 | .033 |
| 16 | 2 | 1.00 | .11 | .026 |
| 17 | 2 | 0.75 | .10 | .024 |
| 18 | 2 | 0.50 | .06 | .014 |
| 19 | 2 | 0.25 | .02 | .005 |
| 20 | 2 | 0.10 | 0 | 0 |
| 21 | Water | | 0 | 0 |

From the corrosion rate values noted in the above table it is apparent that maximum inhibition was obtained in the 2% NaOH solutions at the lower range of NS concentration employed, i. e. 0.10 to 0.25% by weight. With the 5% NaOH solution, satisfactory inhibition was obtained using up to 4.0% NS concentrations.

*Example 5.*—The tests of this example were carried out using microscope slides instead of bottles in order to obtain better accuracy and ease of weighing and a uniform surface area. Also, the use of such slides permitted the study of a more extensive range of test conditions in minimum time and with better observation of the glass surface condition. Four separate aqueous sodium hydroxide solutions were made up containing 2%, 3%, 4% and 5% NaOH, respectively. The aforementioned solutions were added in 150 cc. portions to each of a series of 6-ounce laboratory bottles, and various addition agents including NS, NSBF, beryllium carbonate and beryllium sulfate individually incorporated in various amounts into the bottled NaOH solutions to determine their comparative glass corrosion inhibiting effectiveness. The bottles were sealed and violently agitated to disperse the addition agents, after which the bottles were opened and 3 weighed microscope slides (Arthur H. Thomas Company No. 7030, non-corrosive, size 1" x 3") placed in each bottle so that the slides did not touch each other and touched the bottle only at the top and bottom corners of the slide. The bottles were then sealed and placed in a constant temperature water-filled tank maintained at 160° F. for 14 days, at the end of which time the slides were removed from the bottles, rinsed and weighed. Table 3 below sets forth data and results of these tests.

The weight losses among the triplicate microscope slide samples in each bottle were found to be very consistent, and also the appearance of the slides in each test bottle was very closely the same. From the indicated corrosion rate (calculated from weight loss of the slides) and appearance of the slides, it is seen that the addition agents of the invention gave good inhibition of attack of the glass surface by the caustic soda solutions at concentrations varying from 0.05 to 0.50% of the inhibitor by weight of the Table 3

| Slides From Bottle No. | Percent NaOH | Agent | Percent Agent | Average Weight Loss Each Slide, Grams | Average Corrosion Rate, mg./sq. cm./day | Appearance of Slides |
|---|---|---|---|---|---|---|
| 1 | 0 | Distilled Water | | 0 | 0 | Clear. |
| 2 | 2 | do | | .1484 | .2650 | Severely etched. |
| 3 | 5 | do | | .2241 | .4002 | Do. |
| 4 | 2 | NS | .05 | .0020 | .0036 | Clear. |
| 5 | 2 | do | .10 | .0007 | .0013 | Do. |
| 6 | 2 | do | .20 | .0014 | .0025 | Do. |
| 7 | 2 | do | .30 | .0011 | .0020 | Do. |
| 8 | 2 | do | .50 | .0011 | .0020 | Do. |
| 9 | 3 | do | .50 | .0013 | .0023 | Do. |
| 10 | 4 | do | .50 | .0024 | .0043 | Do. |
| 11 | 5 | do | .05 | .0077 | .0138 | Do. |
| 12 | 5 | do | .10 | .0050 | .0089 | Do. |
| 13 [1] | 5 | do | .50 | .0038 | .0068 | Do. |
| 14 | 2 | NSBF | .05 | .0027 | .0048 | Do. |
| 15 | 2 | do | .50 | .0036 | .0064 | Do. |
| 16 | 2 | Beryllium Carbonate | [2].05 | .0725 | .1294 | Slightly etched. |
| 17 | 2 | do | [2].10 | .0586 | .1047 | Do. |
| 18 | 5 | do | [2].05 | .1358 | .2426 | Etched. |
| 19 | 5 | do | [2].10 | .1069 | .1908 | Do. |
| 20 | 2 | $BeSO_4 \cdot 4H_2O$ | [2].10 | .0047 | .0084 | Clear. |
| 21 | 2 | do | [2].50 | .0030 | .0054 | Do. |
| 22 | 5 | do | [2].10 | .0037 | .0066 | Do. |
| 23 | 5 | do | [2].50 | .0055 | .0098 | Do. |

[1] Solution agitated by bubbling air slowly through it.
[2] Calculated as weight percent BeO based on weight of solution.

solution. It is noted that the excellent results obtained with the nitrosation-sulfitation inhibitors (NS and NSBF) of the invention compare favorably with the use of beryllium compounds for preventing attack of glass by alkali solutions as disclosed in the above mentioned U. S. P. 2,419,805. Thus, as seen in Table 3, beryllium carbonate produced only moderate inhibition of glass corrosion and was less effective than NS or NSBF, and beryllium sulfate gave inhibition values somewhat similar to the nitrosation-sulfitation products hereof.

Example 6.—Seven 6-ounce laboratory bottles were filled with aqueous NaOH solutions, bottles 1, 2, 3 and 4 each being filled with 150 cc. of 3% NaOH solution containing 0.05, 0.10, 0.20 and 0.30% NS respectively, and bottles 5, 6 and 7 each being filled with 150 cc. of 4% NaOH solution containing 0.05, 0.20 and 0.30% NS respectively. Three previously weighed microscope slides of the type employed in Example 5 were placed in each bottle in the manner noted in Example 5 and the bottles maintained in a bath at 160° F. for 14 days. The slides were removed from the bottles and rinsed, dried and weighed at the end of this time. Table 4 below indicates the results obtained.

Table 4

| Slides from Bottle No. | Percent NaOH | Percent NS | Average Weight Loss Each Slide, Grams | Average Corrosion Rate, mg./cm.²/Day | Appearance of Slide |
|---|---|---|---|---|---|
| 1 | 3 | 0.05 | .0042 | .0075 | Clear. |
| 2 | 3 | 0.10 | .0031 | .0056 | Do. |
| 3 | 3 | 0.20 | .0032 | .0058 | Do. |
| 4 | 3 | 0.30 | .0044 | .0078 | Do. |
| 5 | 4 | 0.05 | .0036 | .0065 | Do. |
| 6 | 4 | 0.20 | .0034 | .0062 | Do. |
| 7 | 4 | 0.30 | .0038 | .0068 | Do. |

From Table 4 it is seen that the NS in all of the concentrations tested (i. e. 0.05 to 0.30% by weight) was effective in 3 to 4% aqueous caustic soda solutions as an inhibitor of the attack of the glass by the alkali.

Example 7.—Three 6-ounce soft glass laboratory bottles were each filled with 150 cc. of 2% aqueous NaOH solution, 0.05% and 0.20% NS being added to bottle Nos. 2 and 3 respectively. The bottles were sealed and agitated to disperse the addition agent. The bottles were then opened and three weighed microscope slides of the type employed in Example 5 were placed in each so that the slides did not touch each other, and touched the bottles only at the top and bottom corners of the slides. Thereafter, the bottles were sealed and placed in a constant-temperature, water-filled tank maintained at 160° F. for 26 days. All the slides were removed from the bottles, rinsed and weighed each day during the 26 day period. The chart shown in Fig. 1 of the drawing accompanying the specification indicates the results of these tests in terms of weight loss of the microscope slides as against time.

As seen in Fig. 1, the slides in the straight 2% caustic soda solution containing no addition agent (bottle No. 1) showed a steady loss in weight throughout the entire run, indicating that substantial corrosion of the glass surface took place each day. On the other hand, the slides exposed to the 2% NaOH solution containing 0.05% NS (bottle No. 2) showed only a slight weight loss for 14 days, indicating good inhibition of glass corrosion by the caustic over this period. At the end of the 14 day period, the NS in the 0.05% NS-alkali solution commenced to lose its effectiveness as an inhibitor and the addition of 0.05% NS by weight to this bath on the 18th day in an attempt to reestablish the glass corrosion inhibiting characteristics of the solution appeared unsuccessful. The slides exposed to the 2% aqueous NaOH solution containing 0.20% by weight NS (bottle No. 3) had a low glass corrosion rate for 21 days before the caustic glass attack inhibiting properties of the NS were depleted, as compared to an effective period of 14 days noted above using 0.05% NS. Attempts to restore the inhibiting characteristics of the initial 0.20% N. S. containing solution on the 24th day by incorporating therein an additional 0.20% NS appeared ineffective.

Example 8.—The procedure employed in Example 7 was repeated using 5% aqueous NaOH solutions instead of 2% NaOH solutions. Fig. 2 of the drawing, wherein weight loss of the slides is plotted against time, indicates the results obtained. The slides exposed to 5% aqueous caustic soda solution containing no addition agent showed a steady loss in weight throughout the entire run indicating a steady rate of glass corrosion each day. The tendency of the 5% NaOH solution containing 0.05% NS by weight to attack the glass slides was effectively inhibited for 3 days. Make-up NS (0.05%) added on the 11th day resulted in a decreased rate of corrosion for about 24 hours followed by a steady increase thereafter indicating inability to restore the inhibiting properties of this solution by addition of further quantities of NS thereto. The tendency of the aqueous 5% NaOH solution containing 0.20% NS to corrode the glass slides was inhibited for about 9 days with steady increase in rate of corrosion thereafter.

Example 9.—The test equipment and procedure employed herein was similar to that used in Examples 7 and 8, a 2% aqueous NaOH solution being employed herein. However, the NaOH solutions in this series of tests were allowed to stand at 160° F. in the 6-ounce laboratory bottles for 14 days before the microscope slides were placed in solution. Fig. 3 of the drawing indicates results of these tests in terms of weight loss of the slides against time. The slides exposed to the 2% NaOH solution containing no addition agent showed steady loss in weight from day to day throughout the entire run. The slides exposed to the 2% NaOH solution containing 0.05% NS by weight showed little weight loss for about 7 days after being placed in solution, the NS apparently being ineffective thereafter. On the 9th and 14th days, 0.20% additional NS was added without obtaining any restoration of the glass corrosion inhibiting properties of the solution. The 2% aqueous NaOH solution containing 0.20% NS by weight initially caused little weight loss on the slides for about 14 days after the slides were placed in the solution. After this 14 day period, the corrosion rate increased, and the addition of 0.40% NS on the 15th day did not appear to decrease this rate.

It is seen from Examples 7, 8 and 9 that incorporation of the nitrosation-sulfitation products into aqueous caustic soda washing solutions in accordance with the principles of the invention prevents or inhibits glass corrosion by such solutions during use over comparatively long operating or washing periods. However, when the inhibiting properties of these solutions become depleted, additional quantities of the inhibitor added thereto do not generally restore such properties. Accordingly, spent washing solutions initially prepared and used in accordance with the invention should be discarded and fresh aqueous alkali solutions containing suitable amounts of the addition agents hereof should be substituted.

The degree of inhibition of the attack of glass by caustic alkali solutions brought about by adding thereto the nitrosation-sulfitation products in accordance with the invention, and the length of time this inhibition is retained are determined by the temperature and caustic alkali concentration as well as by the concentration of the inhibiting agent. I have observed that the condition of the glass surface (i. e. whether smooth or etched) apparently has no effect on the glass corrosion inhibiting properties of the nitrosation-sulfitation products of these improvements.

Since various changes and modifications may be made in the invention without departing from the spirit thereof, the invention is to be taken as limited only by the scope of the appended claims.

I claim:

1. The process of inhibiting attack of glass surfaces during washing by the action of aqueous alkali solutions substantially free of phosphates and containing caustic alkali as the principal solute, which comprises adding to said solutions an inhibiting amount of a nitrosation-sulfitation product comprising salts of a mixture of organic acids having carbon contents within the range 10 to 30 carbon atoms, said mixture including sulfonated ketones, sulfonated amines, sulfonated alkylidene sulfamates, sulfonated sulfamates and bisulfite addition products of sulfonated alkylidene sulfamates, and being derived from an unsaturated organic compound having at least one non-aromatic

linkage and a carbon content within the range 10 to 30 carbon atoms, by a process involving reaction of a nitrosating agent with a non-aromatic

linkage of said unsaturated organic compound and reaction of the resulting nitrosation product with a sulfite, and subjecting said glass surfaces to contact with the resulting solutions.

2. The process as defined in claim 1 wherein said aqueous alkali solutions contain 1–10% caustic alkali and the amount of nitrosation-sulfitation product added to said solutions is not less than 0.01% and not more than 5% by weight of the solution.

3. The process as defined in claim 1 wherein said aqueous alkali solutions contain 1–6% caustic soda and the amount of nitrosation-sulfitation product added to said solutions is in the range of 0.03 to 1% by weight of the solution.

4. The process of inhibiting attack of glass surfaces during washing by the action of aqueous alkali solutions substantially free of phosphates and containing as the principal solute caustic soda in amount of 1–6% by weight of the solution, which comprises adding to said solutions 0.05 to 0.5% by weight of a nitrosation-sulfitation product comprising a mixture of organic sodium sulfonates having carbon contents within the range 10 to 30 carbon atoms, said mixture including sulfonated ketones, sulfonated amines, sulfonated alkylidene sulfamates, sulfonated alkyl sulfamates and bisulfite addition products of sulfonated alkylidene sulfamates, and being derived from an olefin hydrocarbon having a carbon content within the range 10 to 30 carbon atoms, by a process involving reaction of a nitrosating agent with said olefin hydrocarbon and reaction of the resulting nitrosation product with a sodium sulfite, and subjecting said glass surfaces to contact with the resulting solutions.

5. The process of inhibiting attack of glass surfaces during washing by the action of aqueous alkali solutions substantially free of phosphates and containing as the principal solute caustic soda in amount of 1–6% by weight of the solution, which comprises adding to said solutions 0.05 to 0.5% by weight of a nitrosation-sulfitation product comprising (a) a mixture of open-chain organic sodium sulfonates having carbon contents within the range 12 to 23 carbon atoms, said mixture of organic sulfonates including sulfonated ketones, sulfonated amines, sulfonated alkylidene sulfamates, sulfonated alkyl sulfamates and bisulfite addition products of sulfonated alkylidene sulfamates, and (b) a mixture of inorganic compounds including sodium sulfite, sodium bisulfite, sodium chloride and sodium sulfate, said nitrosation-sulfitation product containing 30 to 40% organic compounds, 10 to 30% of a mixture of sodium sulfite and sodium bisulfite, 5 to 15% sodium chloride and 20 to 40% sodium sulfate, and being derived from an olefin hydrocarbon having a carbon content within the range 12 to 23 carbon atoms, by a process involving reaction of a nitrosyl halide with said olefin hydrocarbon and reaction of the resulting nitrosation product with a sodium sulfite, and subjecting said glass surfaces to contact with the resulting solutions.

6. The process of inhibiting attack of glass surfaces during washing by the action of aqueous alkali solutions substantially free of phosphates and containing as the principal solute caustic soda in amount of 1–6% by weight of the solution, which comprises adding to said solutions 0.05 to 0.5% by weight of a nitrosation-sulfitation product comprising a mixture of open-chain organic sodium sulfonates having carbon contents within the range 12 to 23 carbon atoms, said mixture of organic sulfonates including sulfonated ketones, sulfonated amines, sulfonated alkylidene sulfamates, sulfonated alkyl sulfamates and bisulfite addition products of sulfonated alkylidene sulfamates, and being derived from an olefin hydrocarbon having a carbon content within the range 12 to 23 carbon atoms, by a process involving reaction of a nitrosyl halide with said olefin hydrocarbon and reaction of the resulting nitrosation product with a sodium sulfite, said nitrosation-sulfitation product being substantially free of inorganic salts, and subjecting said glass surfaces to contact with the resulting solutions.

7. The method of washing glass bottles and the like with aqueous caustic washing solutions while inhibiting corrosion of the glass by said solutions, which comprises contacting said bottles with a heated aqueous solution containing caustic soda as the principal solute in amount of 1–6% by weight of the solution and 0.03 to 1% by weight of a nitrosation-sulfitation product comprising a mixture of sodium salts of a mixture of organic acids having carbon contents within the range 10 to 30 carbon atoms, said mixture including sulfonated ketones, sulfonated amines, sulfonated alkylidene sulfamates, sulfonated sulfamates and bisulfite addition products of sulfonated alkylidene sulfamates, and being derived from an unsaturated organic compound having at least one non-aromatic

linkage and a carbon content within the range 10 to 30 carbon atoms, by a process involving reaction of a nitrosating agent with a non-aromatic

linkage of said unsaturated organic compound and reaction of the resulting nitrosation product with a sodium sulfite, said solution being substantially free of phosphates.

8. The method of washing glass bottles and the like with aqueous caustic washing solutions while inhibiting corrosion of the glass by said solutions, which comprises contacting said bottles with a heated aqueous solution maintained at a temperature not higher than 175° F. and containing caustic soda as the principal solute in amount of 1–6% by weight of the solution and .05 to 0.5% by weight of the nitrosation-sulfitation product defined in claim 4, said solution being substantially free of phosphates.

9. The method of washing glass bottles and the like with aqueous caustic washing solutions while inhibiting corrosion of the glass by said solutions, which comprises contacting said bottles with a heated aqueous solution maintained at a temperature of 140–165° F. and containing caustic soda as the principal solute in amount of 1–6% by weight of the solution and .05 to 0.5% by weight of the nitrosation-sulfitation product defined in claim 5, said solution being substantially free of phosphates.

10. A dry detergent composition substantially free of phosphates comprising at least 50% by weight of caustic alkali and 1 to 50% by weight of said caustic alkali, of the nitrosation-sulfitation product defined in claim 1.

11. A dry solid detergent composition for cleaning glass, said compositions being substantially free of phosphates and comprising at least 50% by weight of caustic soda and 2 to 20% by weight of said caustic soda, of the nitrosation-sulfitation product defined in claim 4.

12. A dry solid detergent composition for cleaning glass, said compositions being substantially free of phosphates and comprising at least 75% by weight of caustic soda and 2–20% by weight of said caustic soda, of the nitrosation-sulfitation product defined in claim 5.

13. An aqueous alkaline glass washing solution of low corrosive action on glass, comprising as the principal solute 1–10% by weight of caustic alkali and not less than 0.01% and not more than 5% by weight of the nitrosation-sulfitation product defined in claim 1, said solution being substantially free of phosphates.

14. An aqueous alkaline glass washing solution of low corrosive action on glass, comprising as the principal solute 1–6% by weight of caustic soda and 0.03 to 1% by weight of the nitrosation-sulfitation product defined in claim 4, said solution being substantially free of phosphates.

15. An aqueous alkaline glass washing solution of low corrosive action on glass, comprising as the principal solute 1–6% by weight of caustic soda and 0.05 to 0.5% by weight of the nitrosation-sulfitation product defined in claim 5, said solution being substantially free of phosphates.

16. A glass cleaning composition substantially free of phosphates comprising as solid ingredients caustic alkali and the nitrosation-sulfitation product defined in claim 1, the caustic alkali constituting at least 50% of the total solids content of the composition and the nitrosation-sulfitation product constituting from 1% to 50% by weight of the caustic alkali, said composition containing at least 1% of said solid ingredients and from 0% to 99% water.

MARTIN L. HASSEL.

REFERENCES CITED

The following references are of record in the file of this patent:

UNITED STATES PATENTS

| Number | Name | Date |
| --- | --- | --- |
| 2,419,805 | Wegst | Apr. 29, 1947 |
| 2,425,907 | Wegst et al. | Aug. 19, 1947 |
| 2,428,187 | Wegst et al. | Sept. 30, 1947 |